US007699131B2

(12) United States Patent
Wu

(10) Patent No.: US 7,699,131 B2
(45) Date of Patent: Apr. 20, 2010

(54) ELECTRIC FOLDABLE WHEELCHAIR

(75) Inventor: Donald P. H. Wu, Sinfong Township, Hsinchu County (TW)

(73) Assignee: Pihsiang Machinery Manufacturing Co., Ltd., Hsinchu County (TW)

( * ) Notice: Subject to any disclaimer, the term of this patent is extended or adjusted under 35 U.S.C. 154(b) by 284 days.

(21) Appl. No.: 11/697,707

(22) Filed: Apr. 7, 2007

(65) Prior Publication Data

US 2008/0245592 A1 Oct. 9, 2008

(51) Int. Cl.
*B62K 15/00* (2006.01)
*B62D 63/02* (2006.01)

(52) U.S. Cl. ....................... 180/208; 180/907; 280/287; 280/650

(58) Field of Classification Search ................. 180/208, 180/907; 280/287, 647, 650
See application file for complete search history.

(56) References Cited

U.S. PATENT DOCUMENTS 3,882,949 A * 5/1975 Anderson ................... 180/8.2
4,326,732 A * 4/1982 Gall et al. ................... 280/642
4,351,562 A * 9/1982 Twitchell et al. ....... 297/344.17
4,613,151 A * 9/1986 Kielczewski ................ 280/650
4,614,246 A * 9/1986 Masse et al. ................. 180/6.5
4,809,998 A * 3/1989 Girvin ..................... 280/250.1
5,240,277 A * 8/1993 Scheulderman ............. 280/650
5,366,036 A * 11/1994 Perry ........................ 180/65.1
5,556,121 A * 9/1996 Pillot ...................... 280/304.1
5,762,155 A * 6/1998 Scheulderman ............ 180/65.1
5,772,226 A * 6/1998 Bobichon ................ 280/250.1
6,135,222 A * 10/2000 Furukawa .................. 180/65.5
6,183,002 B1 * 2/2001 Choi et al. .................. 280/647
6,345,835 B1 * 2/2002 Watkins ...................... 280/650
6,938,911 B1 * 9/2005 Shyu et al. ............... 280/250.1

* cited by examiner

*Primary Examiner*—Paul N Dickson
*Assistant Examiner*—Laura Freedman
(74) *Attorney, Agent, or Firm*—Banger Shia

(57) ABSTRACT

An electric wheelchair comprises: a chair assembly and a wheel assembly. The wheel assembly is mounted at the bottom of the chair assembly. The chair assembly includes a seat, a first frame, a second frame, and a third frame, which are pivotally connected to form a four-bar linkage mechanism, so that the seat and the respective frames of the electric wheelchair will be folded synchronously in the same direction when the electric wheelchair is being folded, and the folding direction of the chair assembly is vertical to the axis of the drive wheels of the wheel assembly, thus allowing the disabled user to fold the chair assembly and to disassemble the wheel assembly quickly and effortlessly.

5 Claims, 11 Drawing Sheets

ELECTRIC FOLDABLE WHEELCHAIR

BACKGROUND OF THE INVENTION

1. Field of the Invention

The present invention relates to an electric wheelchair, and more particularly to an electric foldable wheelchair.

2. Description of the Prior Art

With the social development and the growth of humanitarianism, and in order to solve the mobility problem of the disabled or elderly person, electric wheels have been developed to assist the disabled person in moving around.

U.S. Pat. No. 6,135,222 discloses an installing structure for an electric wheelchair, as shown in FIG. 1, wherein the electric wheelchair 10 comprises a chair assembly 11 and a wheel assembly 12. The chair assembly 11 includes a pair of chair frames 111, 112, and a foldable seat 113 and a foldable bar assembly 114 between the chair frames 111 and 112. The chair frames 111 and 112 are foldable in the transverse direction through the foldable bar assembly 114. The wheel assembly 12 includes two front wheels 121, two drive wheels 122 and two auxiliary rear wheels 123, which are disposed sequentially at the bottom of the chair frame 111 of the chair assembly 11. The abovementioned structure has the following problems:

First, when folding the electric wheelchair 10, it must disassemble the drive wheels 122 from the chair frames 111 and 112, otherwise, the drive wheels 122 cannot be folded and put away.

Second, the chair assembly 11 and the wheel assembly 12 must be stored separately after being disassembled from each other, which will occupy a lot of space, further, the chair assembly 11 and the wheel assembly 12 are difficult to manage after being put away separately.

Third, since the drive wheels 122 is provided with drive structure and connecting structure, which increases the weight of the wheel assembly 12, and as a result, the disabled person has to take more time and strength to assemble or disassemble the wheelchair.

The present invention has arisen to mitigate and/or obviate the afore-described disadvantages.

SUMMARY OF THE INVENTION

The primary objective of the present invention is to provide an electric foldable wheelchair, The chair assembly includes a seat, a first frame, a second frame, and a third frame, which are pivotally connected to form a four-bar linkage mechanism, so that the seat and the respective frames of the electric wheelchair will be folded synchronously in the same direction when the electric wheelchair is being folded, and the folding direction of the chair assembly is vertical to the axis of the drive wheels of the wheel assembly, thus allowing the disabled user to fold the chair assembly and to disassemble the wheel assembly quickly and effortlessly.

DETAILED DESCRIPTION OF THE PREFERRED EMBODIMENTS

The present invention will be clearer from the following description when viewed together with the accompanying drawings, which show, for purpose of illustrations only, the preferred embodiment in accordance with the present invention.

Referring to FIGS. 4-11, an electric wheelchair in accordance with the present invention comprises a chair assembly 20 and a wheel assembly 30.

Figure 1:
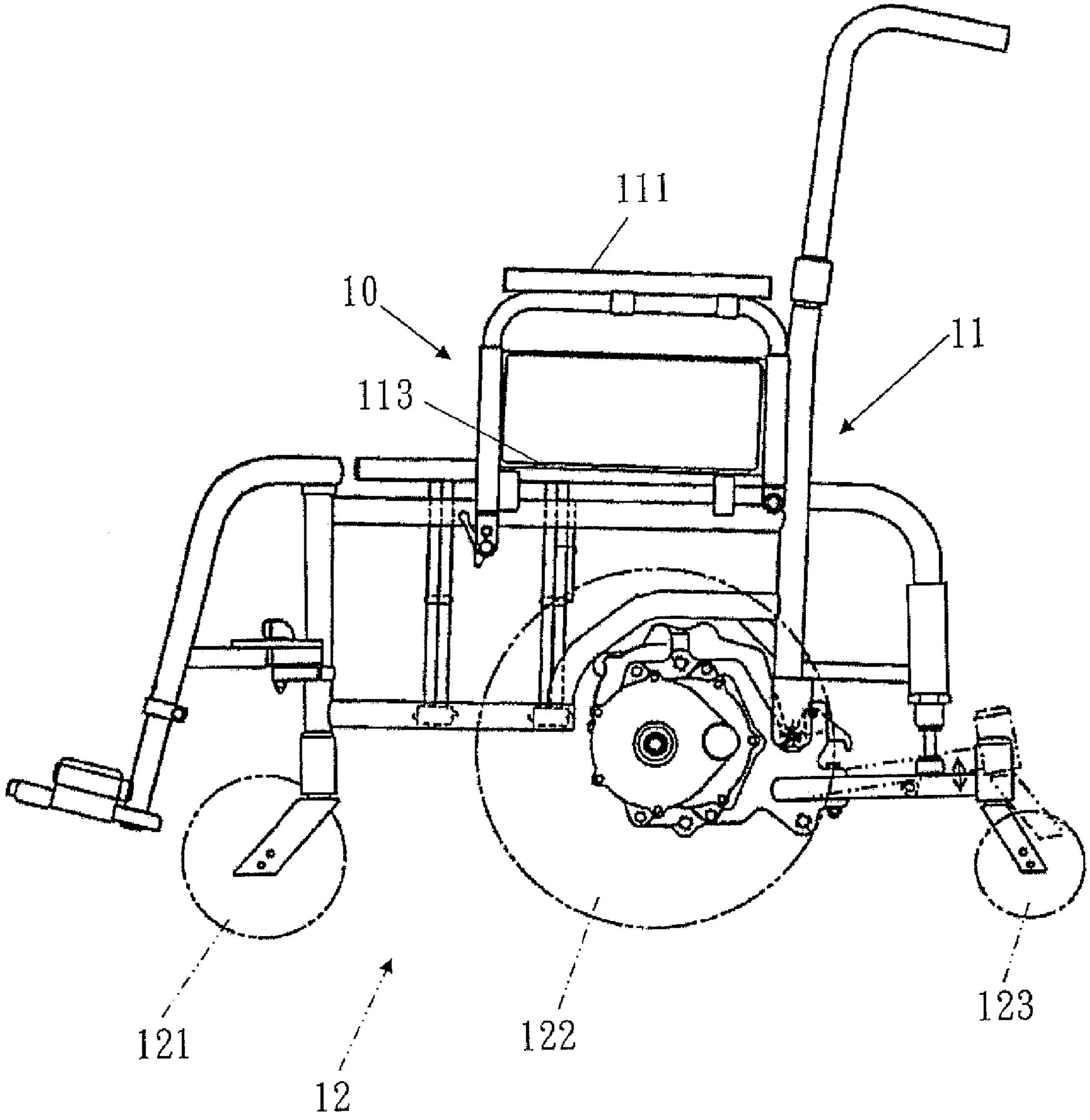
FIG. 1 PRIOR ART
FIG. 1 is a side view of a foldable wheelchair disclosed in U.S. Pat. No. 6,135,222.
Figure 2:
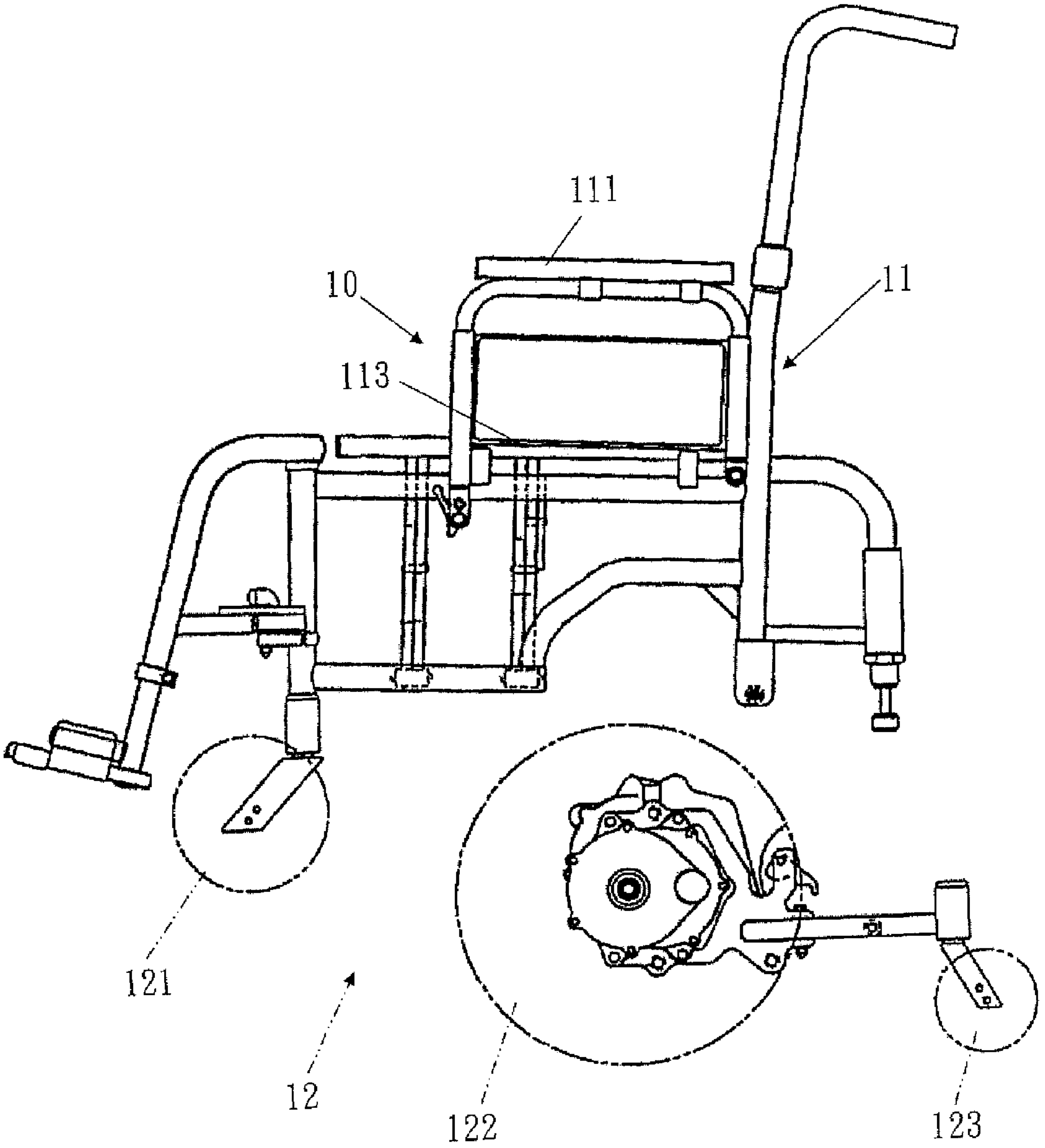
FIG. 2 PRIOR ART
FIG. 2 shows that the foldable wheelchair of U.S. Pat. No. 6,135,222 is disassembled.
Figure 3:
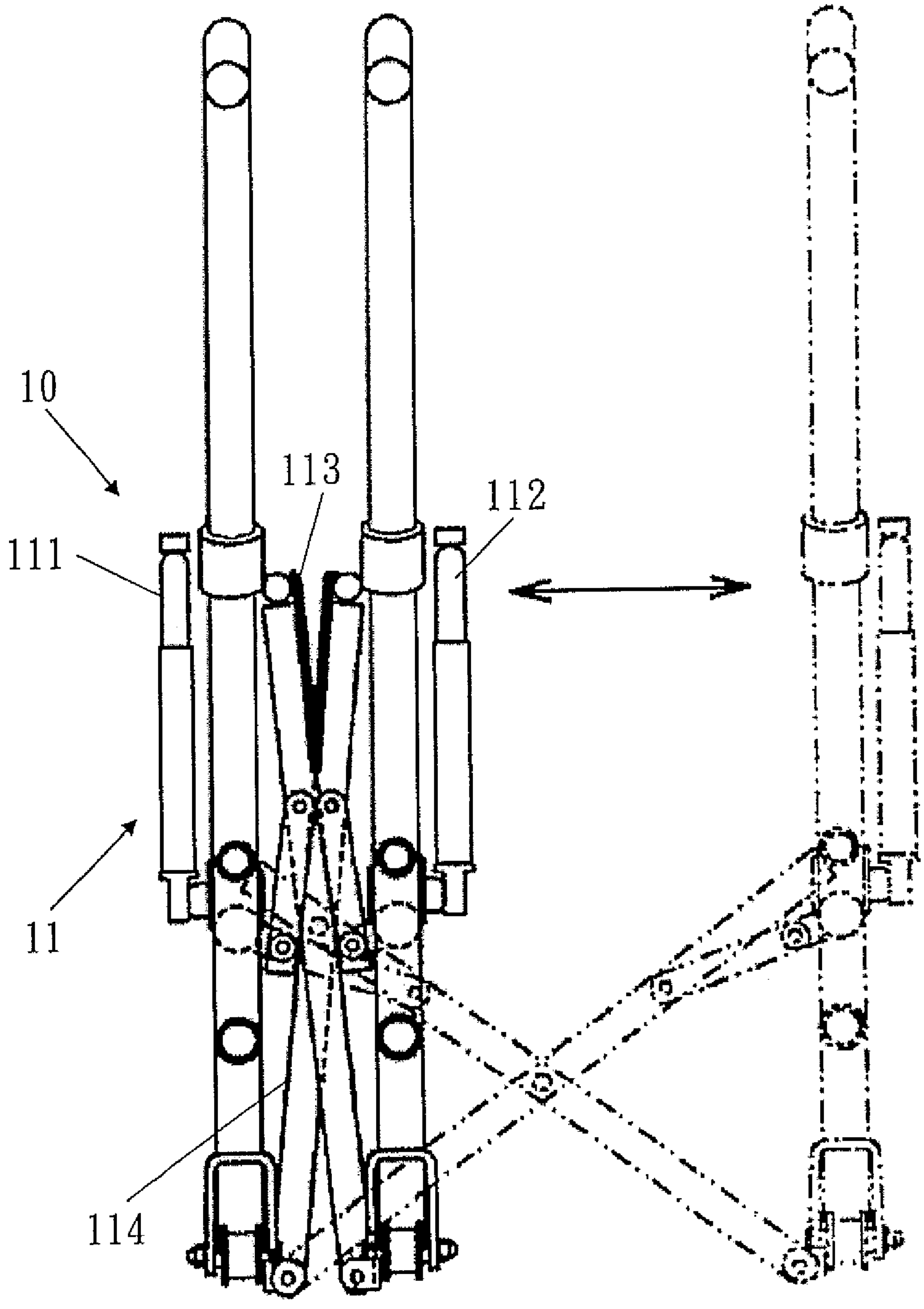
FIG. 3 PRIOR ART
FIG. 3 shows the folding state of the foldable wheelchair of U.S. Pat. No. 6,135,222.
Figure 4:
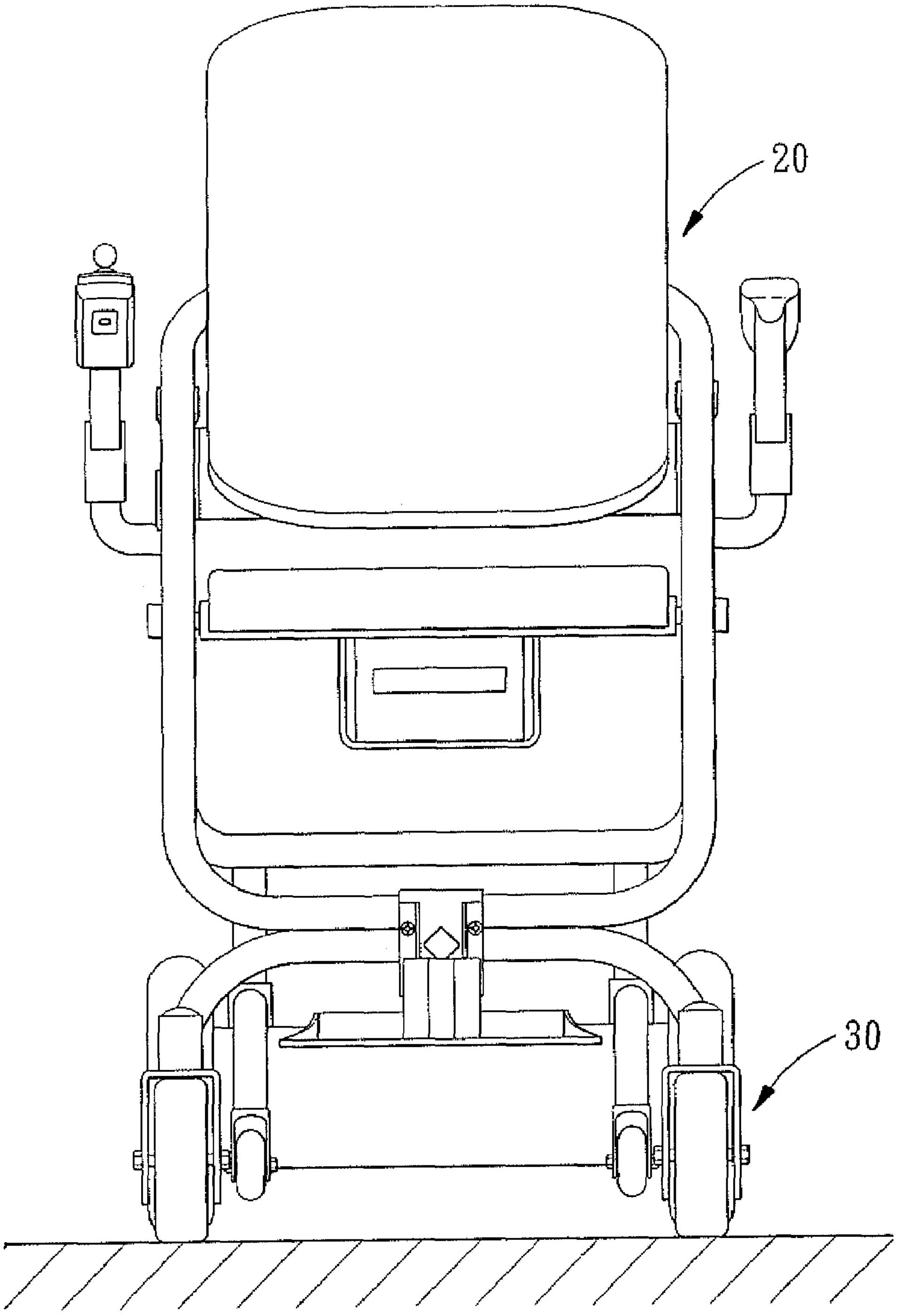
FIG. 4 is a front view of an electric foldable wheelchair in accordance with the present invention.
Figure 5:
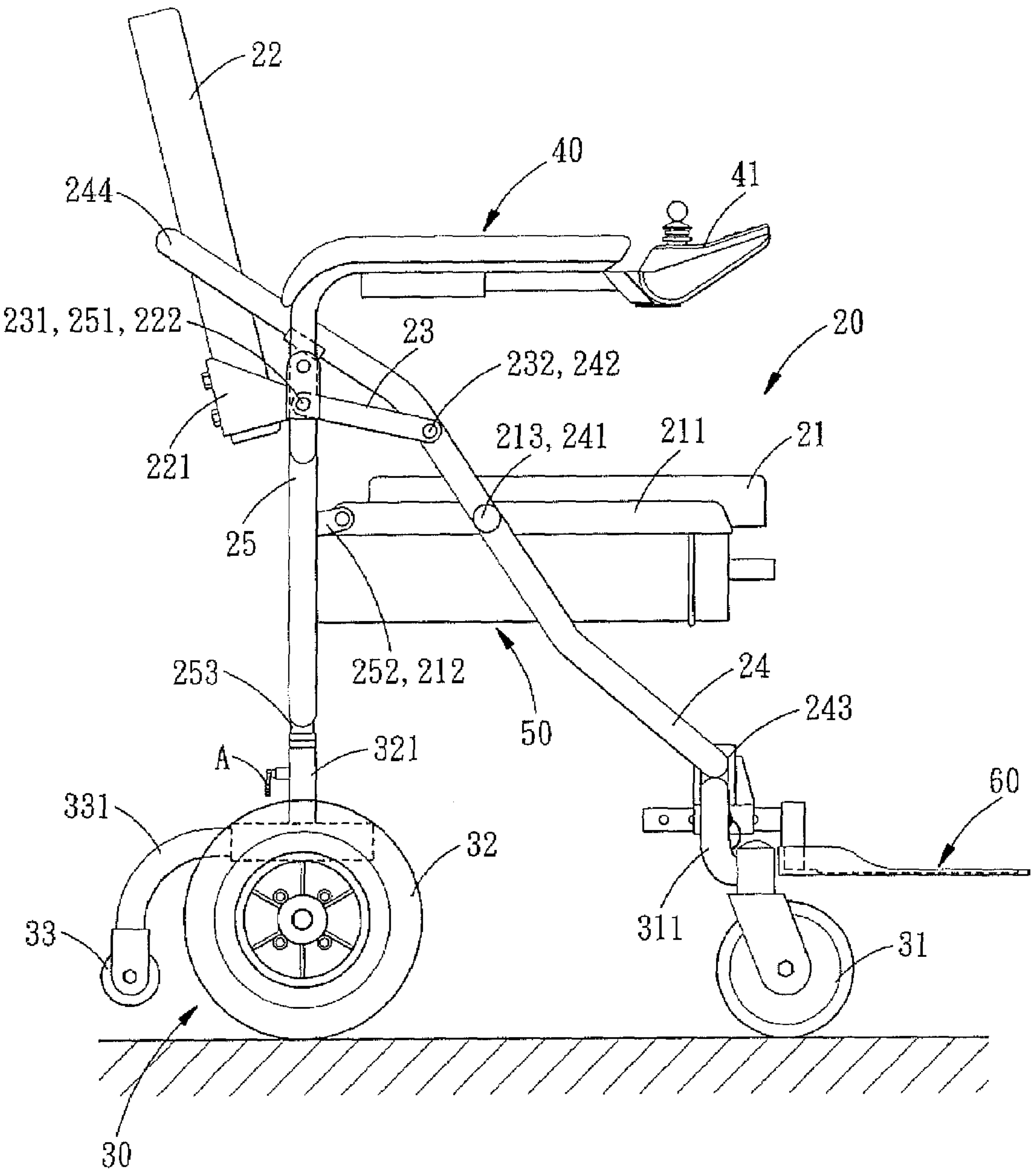
FIG. 5 is a side view of the electric foldable wheelchair in accordance with the present invention.

The chair assembly 20 (as shown in FIG. 5) includes a seat 21, a chair back 22, a first frame 23, a second frame 24, and a third frame 25. The seat 21 is board-shaped, and at the lower side of the seat 21 is fixed a pivot frame 211. A first pivot point 212 is disposed at one end of each of two opposite sides of the pivot frame 211, disposed beside the first pivot point 212 is a second pivot point 213, and the first and second pivot points 212 and 213 are located a specific distance from each other. The chair back 22 is a board-shaped, at one end of each of two opposite sides of the chair back 22 is disposed a pivot piece 221, and located at one end of each pivot piece 221 is a first pivot portion 222. A first pivot portion 231 and a second pivot portion 232 are disposed at both ends of the first frame 23, respectively. A third pivot point 241 is located in the middle of one side of the second frame 24, and beside the third pivot point 241 is a fourth pivot point 242. A first connecting portion 243 is located at one end of the second frame 24, and an abutting portion 244 is formed at the other end of the second frame 24. The third pivot point 241 of the second frame 24 is pivotally connected to the second pivot point 213 of the seat 21, the fourth pivot point 242 of the second frame 24 is pivotally connected to the second pivot portion 232 of the first frame 23, and chair back 22 rests against the abutting portion 244 of the second frame 24. A third pivot portion 251 is arranged at one end of the third frame 25, a fourth pivot portion 252 is located beside the third pivot portion 251, and a second connecting portion 253 is located at the other end of the third frame 25. The third pivot portion 251 of the third frame 25 is pivotally connected to the first pivot portion 231 of the first frame 23 and the first pivot portion 222 of the pivot piece 221 of the chair back 22, simultaneously, and the fourth pivot portion 252 of the third frame 25 is pivotally connected to the first pivot point 212 of the pivot frame 211 of the seat 21.

Figure 6:
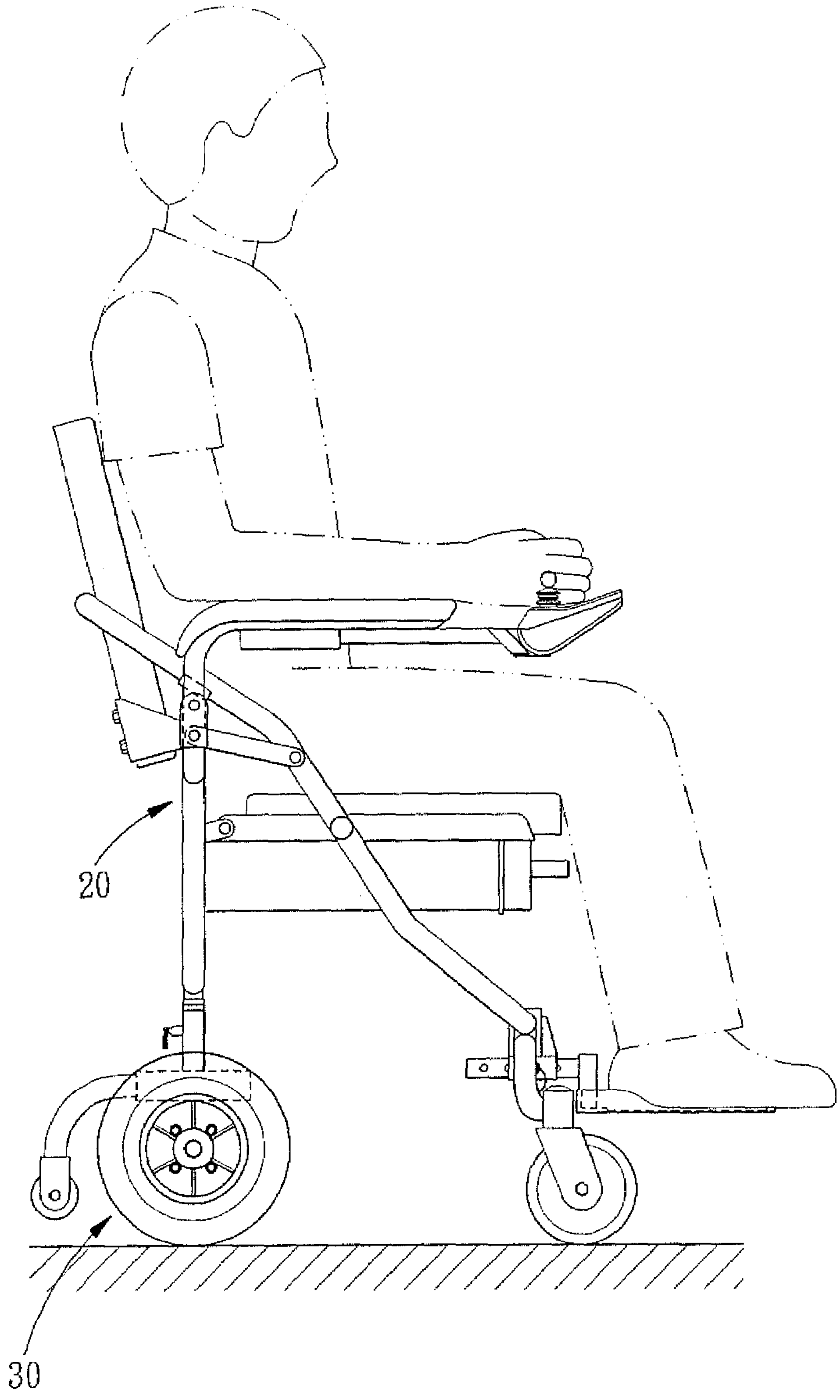
FIG. 6 is an operational view of the electric foldable wheelchair in accordance with the present invention.
Figure 7:
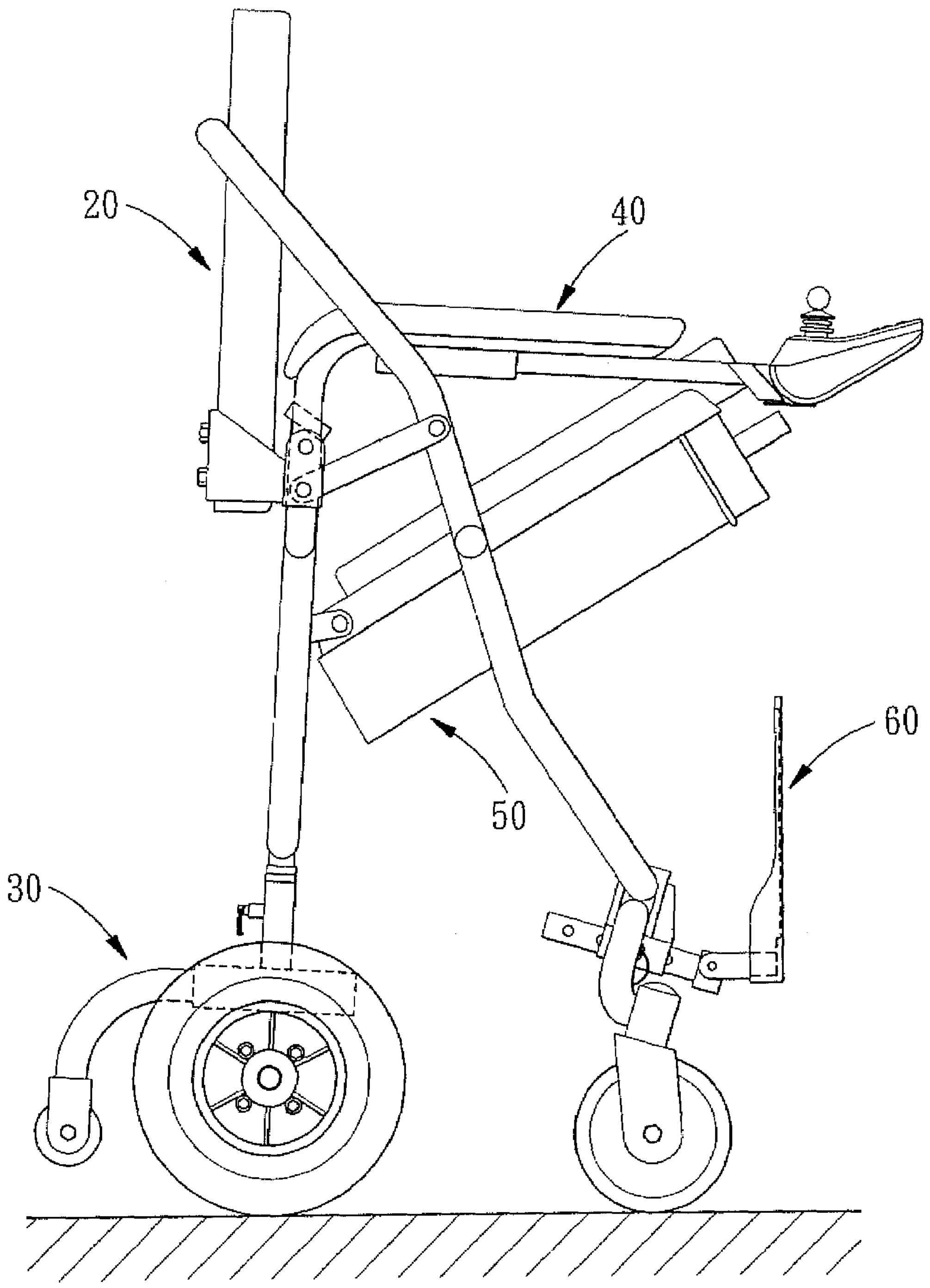
FIG. 7 is a perspective view of showing the folding state of the electric foldable wheelchair in accordance with the present invention.

From the above description, we can find that, as shown in FIG. 6, by pivotally connecting the seat 21 to the second frame 24, the second frame 24 to the first frame 23, the first frame 23 to the third frame 25, and the third frame 25 to the seat 21, respectively, the seat 21, the first frame 23, the second frame 24, and the third frame 25 of the chair assembly 20 form a four-bar linkage mechanism. The seat 21 of the chair assembly 20 allows the user to sit thereon, and the chair back 22 of the chair assembly 20 serves to support the back of the user. The seat 21 and the chair back 22 of the chair assembly 20 enables the user to sit comfortably on the wheelchair.

The wheel assembly 30 includes two front wheels 31, two drive wheels 32, and two auxiliary rear wheels 33. Each of the front wheels 31 is provided with a third connecting portion 311 to be connected to the first connecting portion 243 of the second frame 24. Each of the drive wheels 32 is provided with a fourth connecting portion 321, and each of the auxiliary rear wheels 33 is also provided with a fifth connecting portion 331. The axis of the auxiliary rear wheels 33 is parallel to that of the drive wheels 32. The connecting portion 331 of the auxiliary rear wheels 33 is connected to the lower end of the fourth connecting portion 321 of the drive wheels 32, and the upper end of the fourth connecting portion 321 of the drive wheels 32 is detachably connected to the second connecting portion 253 of the third frame 25. The fourth connecting portion 321 of the respective drive wheels 32 is tubular-shaped and is to be inserted and positioned in the second connecting portion 253 of the third frame 25 by an inserting pin A. By pulling the inserting pin A out, the fourth connecting portion 321 of the drive wheels 32 can be dissembled from the second connecting portion 253 of the third frame 25.

The electric wheelchair is further provided with an armrest frame 40, a battery 50, a footrest 60, and a positioning strap 70. At one end of the armrest frame 40 is arranged a control lever 41, and the other end of the armrest frame 40 is mounted on the third pivot portion 251 of the third frame 25. The control lever 41 of the armrest frame 40 is electrically connected to the drive wheels 32 of the wheel assembly 30 for controlling the moving direction. The battery 50 is detachably fixed to the bottom of the pivot frame 211 of the seat 21 of the chair assembly 20 and is electrically connected to the drive wheels 32 of the wheel assembly 30 for supplying electric power. The footrest 60 is foldably mounted between the first frame 23 of the chair assembly 20 and the front wheels 31 of the wheel assembly 30 for supporting the user's feet. After the chair assembly 20 is folded, one end of the positioning strap 70 wraps around the front end of the seat 21 of the chair assembly 20 and the abutting portion 244 of the second frame 24, and then both ends of the positioning strap 70 are bonded together to keep the electric wheelchair in a folded state.

For a better understanding of the present invention, its operation and function, reference should be made to FIGS. 6-11.

Figure 8:
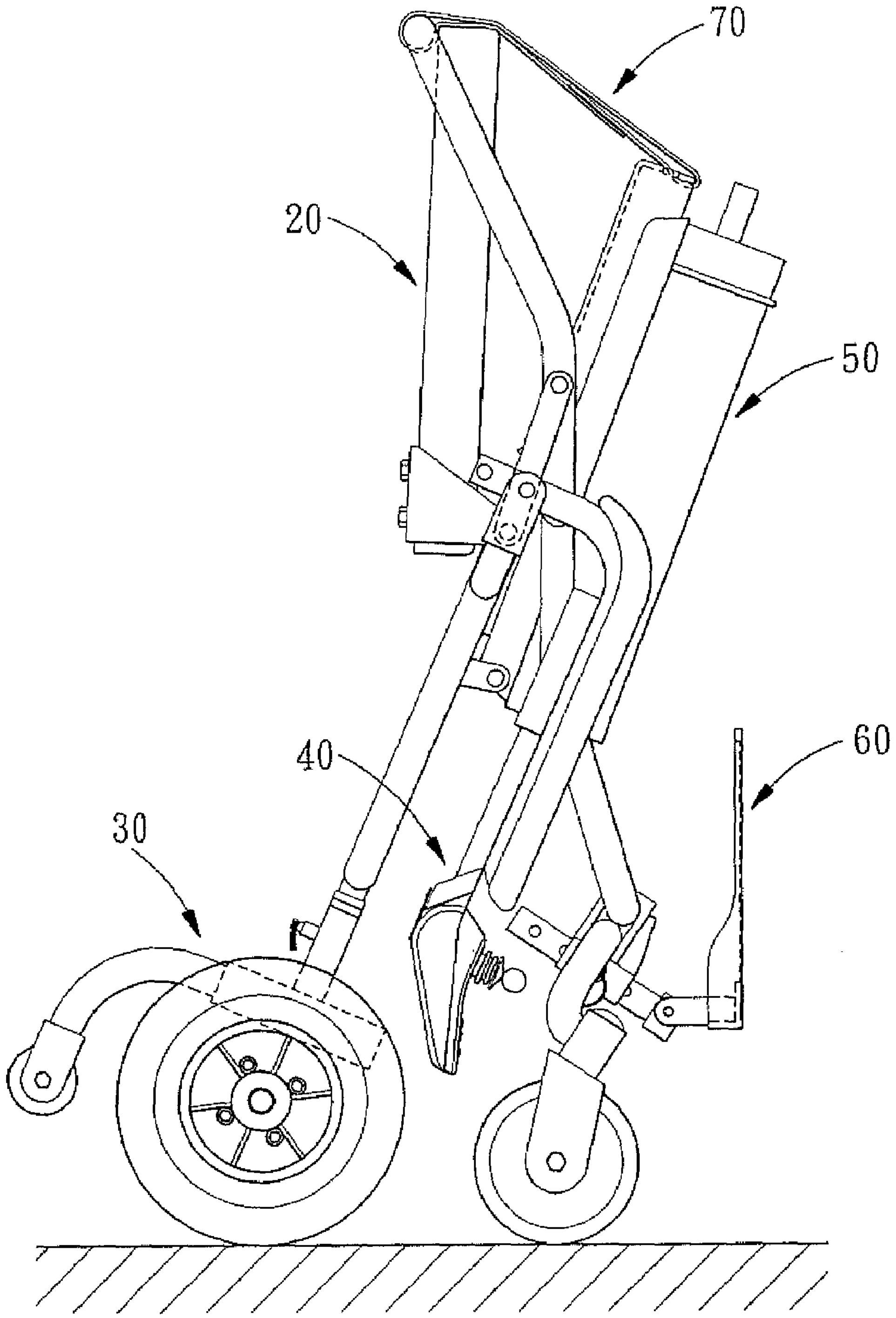
FIG. 8 is a perspective view of showing that the electric foldable wheelchair in accordance with the present invention have been folded.
Figure 9:
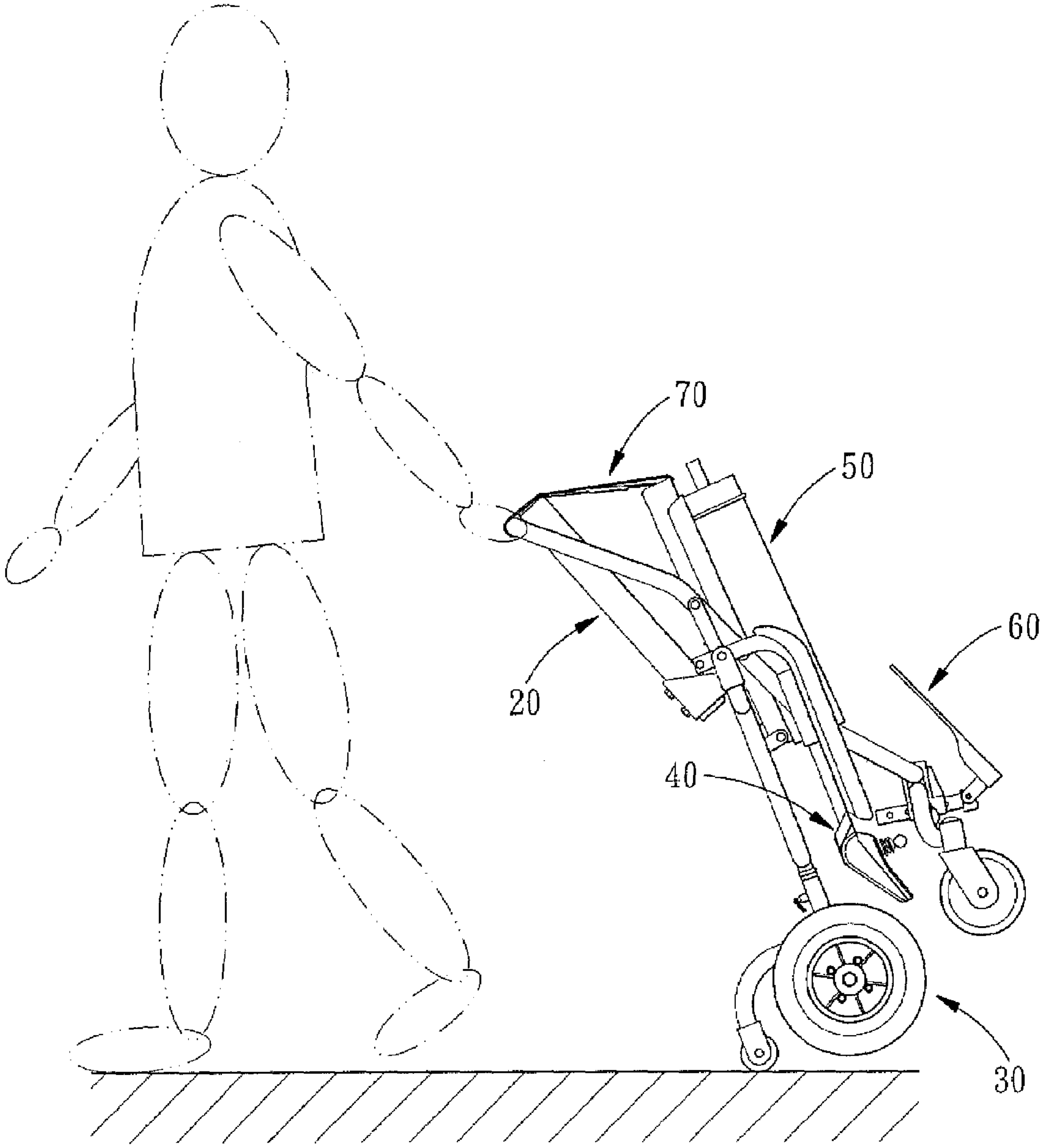
FIG. 9 shows that the folded wheelchair is wheeled by the user.
Figure 10:
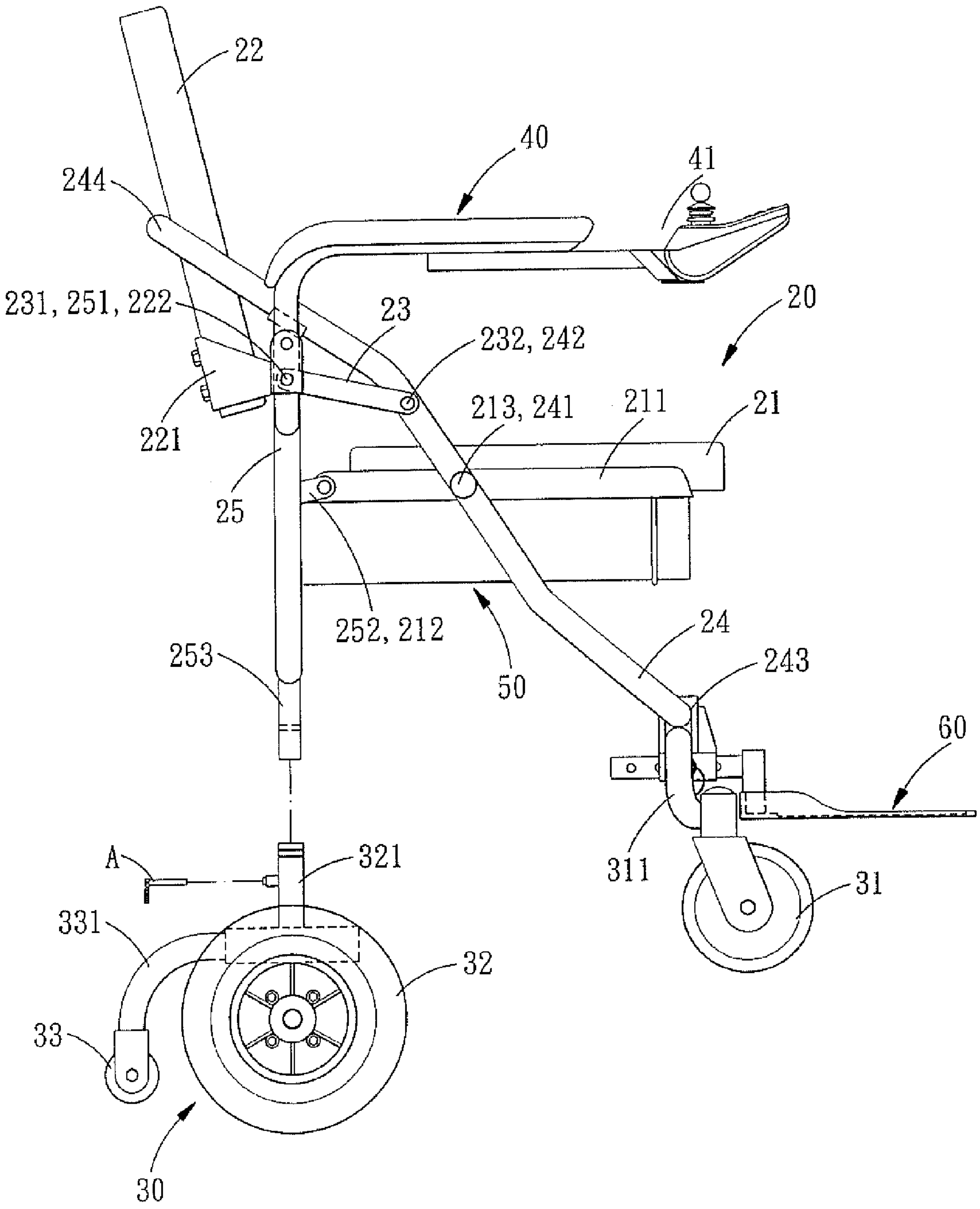
FIG. 10 shows that the wheel assembly of the electric foldable wheelchair in accordance with the present invention is being disassembled.
Figure 11:
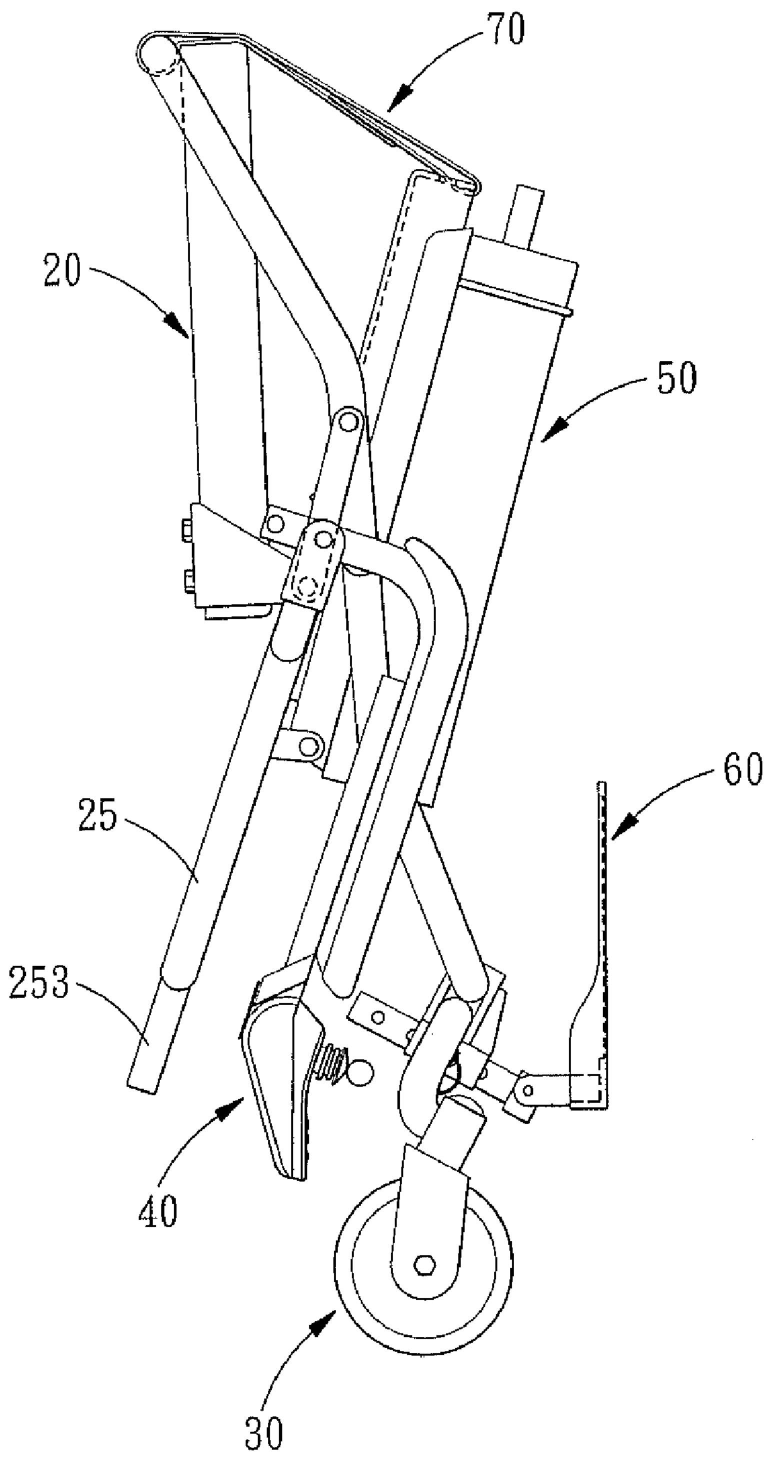
FIG. 11 shows that the wheel assembly of the electric foldable wheelchair in accordance with the present invention has been disassembled.

When folding the electric wheelchair (as shown in FIG. 6), initially, a force should be applied to the seat 21 and the chair back 22 of the chair assembly 20, since the seat 21 and the second frame 24, the second frame 24 and the first frame 23, the first frame 23 and the third frame 25, the third frame 25 and the seat 21 are pivotally connected to each other, respectively, the seat 21, the first frame 23, the second frame 24, and the third frame 25 of the chair assembly 20 form a four-bar linkage mechanism, which provides a same-directional folding path for the chair assembly, namely, the seat and the respective frames of the electric wheelchair will be folded synchronously in the same direction when the electric wheelchair is being folded, and the folding path of the chair assembly 20 is vertical to the axis of the drive wheels 32 of the wheel assembly 30. After the electric wheelchair is folded, the positioning strap 70 is used to fix the seat 21 to the chair back 22 of the chair assembly 20, as shown in FIG. 8, so that the electric wheelchair is kept in a folded state by the positioning strap 70 (as shown in FIG. 9) and can be wheeled around easily by the user. In addition, The fourth connecting portion 321 of the respective drive wheels 32 is inserted and positioned in the second connecting portion 253 of the third frame 25 by the inserting pin A, as shown in FIGS. 10 and 11, such an arrangement makes it easier to assemble and disassemble the drive wheels.

To summarize, the electric wheelchair in accordance with the present invention comprises: a chair assembly and a wheel assembly. The wheel assembly is mounted at the bottom of the chair assembly. The chair assembly includes a seat, a first frame, a second frame, and a third frame, which are pivotally connected to form a four-bar linkage mechanism, so that the seat and the respective frames of the electric wheelchair will be folded synchronously in the same direction when the electric wheelchair is being folded, and the folding direction of the chair assembly is vertical to the axis of the drive wheels of the wheel assembly, thus allowing the disabled user to fold the chair assembly and to disassemble the wheel assembly quickly and effortlessly.

While we have shown and described various embodiments in accordance with the present invention, it is clear to those skilled in the art that further embodiments may be made without departing from the scope of the present invention.

What is claimed is:

1. An electric foldable wheelchair comprising:

a chair assembly including a seat, a first frame, a second frame, and a third frame, the seat being pivotally connected to the second frame, the second frame being pivotally connected to the first frame, the first frame being pivotally connected to the third frame, the third frame being pivotally connected to the seat, the seat, the first frame, the second frame, and the third frame cooperating with each other to form a four-bar linkage mechanism that enable the chair assembly to have a same-directional folding path; and a wheel assembly including two drive wheels mounted at a bottom of the third frame of the chair assembly, and the folding path of the chair assembly being vertical to an axis of the drive wheels of the wheel assembly;

a first pivot point is disposed at one end of each of two opposite sides of the seat, disposed beside the first pivot point is a second pivot point, a first pivot portion and a second pivot portion are disposed at both ends of the first frame, respectively, a third pivot point is located at a center of one side of the second frame, and beside the third pivot point is a fourth pivot point, a first connecting portion is located at one end of the second frame, and an abutting portion is formed at the other end of the second frame, the third pivot point of the second frame is pivotally connected to the second pivot point of the seat, the fourth pivot point of the second frame is pivotally connected to the second pivot portion of the first frame, a third pivot portion is arranged at one end of the third frame, a fourth pivot portion is located beside the third pivot portion, and a second connecting portion is located at the other end of the third frame, the third pivot portion of the third frame is pivotally connected to the first pivot portion of the first frame, and the fourth pivot portion of the third frame is pivotally connected to the first pivot point of the seat, the wheel assembly further includes two front wheels and two auxiliary rear wheels, each of the front wheels has a third connecting portion to be connected to the first connecting portion of the second frame, each of the drive wheels is provided with a fourth connecting portion, and each of the auxiliary rear wheels is also provided with a fifth connecting portion, an axis of the auxiliary rear wheels is parallel to that of the drive wheels, the fifth connecting portion of the auxiliary rear wheels is connected to a lower end of the fourth connecting portion of the drive wheels, and an upper end of the fourth connecting portion of the drive wheels is detachably connected to the second connecting portion of the third frame.

2. The electric foldable wheelchair as claimed in claim 1, wherein the chair assembly further includes a chair back, at one end of each of two opposite sides of the chair back is disposed a pivot piece, located at one end of each pivot piece is a first pivot portion, the first pivot portion of the pivot piece of the chair back is pivotally connected to the third pivot portion of the third frame.

3. The electric foldable wheelchair as claimed in claim 2 further comprising armrest frame, at one end of the armrest frame is arranged a control lever, and the other end of the armrest frame is mounted on the third pivot portion of the third frame, the control lever of the armrest frame is electrically connected to the drive wheels of the wheel assembly for controlling moving direction of the electric wheelchair; and a battery is detachably fixed to a bottom of a pivot frame of the seat of the chair assembly and is electrically connected to the drive wheels of the wheel assembly for supplying electric power.

4. The electric foldable wheelchair as claimed in claim 3 further comprising a footrest foldably mounted between the first frame of the chair assembly and the front wheels of the wheel assembly for supporting user's feet.

5. The electric foldable wheelchair as claimed in claim 4 further comprising a positioning strap for wrapping around the front end of the seat of the chair assembly and the abutting portion of the second frame, so as to maintain the electric foldable wheelchair in a folded state.

* * * * *